(12) United States Patent
Tashiro et al.

(10) Patent No.: US 7,394,606 B2
(45) Date of Patent: Jul. 1, 2008

(54) INFORMATION STORAGE DEVICE AND WRITE CONTROL CIRCUIT

(75) Inventors: Masami Tashiro, Kawasaki (JP); Masafumi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 11/509,201

(22) Filed: Aug. 23, 2006

(65) Prior Publication Data

US 2007/0214312 A1  Sep. 13, 2007

(30) Foreign Application Priority Data

Mar. 9, 2006  (JP) ............................. 2006-064103

(51) Int. Cl.
*G11B 5/09* (2006.01)
*G11B 27/36* (2006.01)

(52) U.S. Cl. .......................................... 360/53; 360/49
(58) Field of Classification Search ....................... None
See application file for complete search history.

(56) References Cited

U.S. PATENT DOCUMENTS 6,751,757 B2 *  6/2004  Biskup et al. .................. 714/54
2002/0184556 A1 *  12/2002  Hashemi .......................... 714/6

FOREIGN PATENT DOCUMENTS

JP  52-04011  3/1977

* cited by examiner

Primary Examiner—Jason C Olson
(74) Attorney, Agent, or Firm—Greer, Burns & Crain, Ltd.

(57) ABSTRACT

On writing information to an information recording medium including multiple recording areas having logical addresses assigned thereto, each of the recording areas having information recorded therein with a check code generated based on the logical address of the recording area added thereto, the logical address is converted to a physical location of the recording area on the information recording medium, the information recorded in the recording area at that location is read and it is checked whether or not there is a match between the check code added to the information and the logical address so as to write the information only in the case where it is confirmed that there is a match.

9 Claims, 10 Drawing Sheets

CASE OF WRITE INSTRUCTION OF 10 BLOCKS FROM LBA=50
LBA=00: CYLINDER=0, HEAD=0, SECTOR=00
LBA=01: CYLINDER=0, HEAD=0, SECTOR=01
⋮
LBA=20: CYLINDER=0, HEAD=0, SECTOR=20
⋮
LBA=50: CYLINDER=0, HEAD=0, SECTOR=50  <== WRITING START POSITION
⋮
LBA=59: CYLINDER=0, HEAD=0, SECTOR=59  <== WRITING FINISH POSITION

CASE OF WRITE INSTRUCTION OF 10 BLOCKS FROM LBA=10
LBA=00: CYLINDER=0, HEAD=0, SECTOR=00
⋮
LBA=10: CYLINDER=0, HEAD=0, SECTOR=10 <== WRITING START POSITION
⋮
LBA=19: CYLINDER=0, HEAD=0, SECTOR=19 <== WRITING FINISH POSITION
⋮
LBA=80: CYLINDER=0, HEAD=0, SECTOR=20
⋮
LBA=99: CYLINDER=0, HEAD=0, SECTOR=99

Fig. 12

CASE OF WRITE INSTRUCTION OF 10 BLOCKS FROM LBA=50
LBA=00:CYLINDER=0, HEAD=0, SECTOR=00
⋮
LBA=19:CYLINDER=0, HEAD=0, SECTOR=19
DEFECT:CYLINDER=0, HEAD=0, SECTOR=20
LBA=20:CYLINDER=0, HEAD=0, SECTOR=21
⋮
LBA=50:CYLINDER=0, HEAD=0, SECTOR=51<== WRITING START POSITION
⋮
LBA=59:CYLINDER=0, HEAD=0, SECTOR=60<== WRITING FINISH POSITION

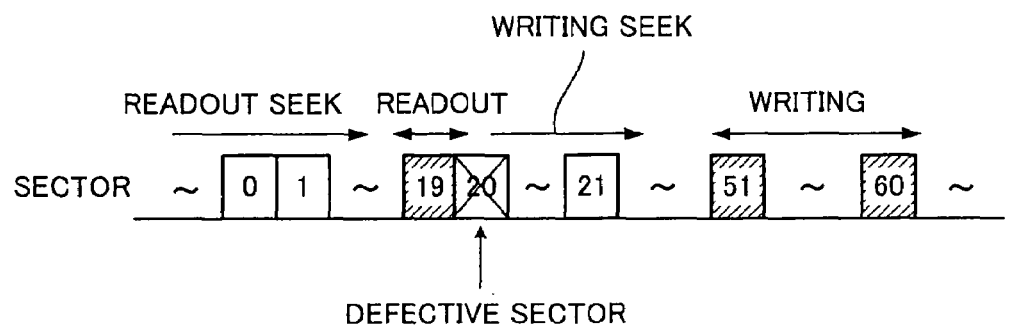

Fig. 13

WRITE INSTRUCTION OF 10 BLOCKS FROM LBA=50
WRITE INSTRUCTION OF 5 BLOCKS FROM LBA=30

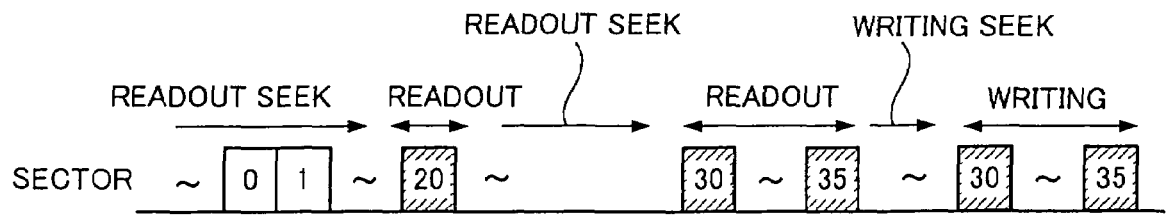

INFORMATION STORAGE DEVICE AND WRITE CONTROL CIRCUIT

BACKGROUND OF THE INVENTION

1. Field of the Invention

The present invention relates to an information storage device for storing information and a write control circuit for controlling writing of information to an information recording medium.

2. Description of the Related Art

There is an ever-increasing amount of information in conjunction with development of information society, where development of a large-capacity and low-cost storage device is required to address this increasing amount of information. In particular, a magnetic disk for performing information access in magnetic fields is receiving attention as an information-rewritable high-density storage medium. For the sake of furthering the large capacity, active research and development are going on as to a magnetic disk device having the magnetic disk and a head built therein to perform information access to the magnetic disk with the head.

FIG. 1 is a conceptual diagram of the magnetic disk device.

The magnetic disk device normally has multiple magnetic disks 10 placed concentrically therein, and a head 20 for applying the magnetic fields is provided on each of the two sides of each individual magnetic disk 10. The magnetic disk 10 has linear tracks 12 provided thereon, and the tracks 12 provided at the same location on the multiple magnetic disks 10 are collectively handled as a cylinder 11. The magnetic disk 10 is divided into multiple areas (sectors 13) in a circumferential direction of the tracks 12, and the magnetic disk device has a series of logical addresses assigned to each of the sectors 13.

The magnetic disk device is often built in or connected to a host device, such as a personal computer. If a logical address is specified by the host device, the magnetic disk device calculates a physical address configured by a cylinder number representing one of the multiple tracks 12, a head number representing one of the multiple heads 20 and a sector number representing one of the multiple sectors 13 based on the specified logical address so as to move a scanning position 14 of the head 20 to the sector 13 indicated by the calculated physical address. The magnetic disk 10 is rotated in a state of having the head 20 moved so as to perform information access along the track 12 to the sector 13 to which the logical address specified by the host device is assigned.

Japanese Patent Laid-Open No. 52-040111 describes a technique of recording the physical address in each of multiple storage areas (the sectors) on the magnetic disk in advance, and when writing information to the storage area indicated by the physical address calculated based on the logical address, moving the head to the storage area indicated by the calculated physical address and writing the information after confirming a match between the physical address recorded in the storage area of a location to which the head is moved and the calculated physical address. According to the technique described in Japanese Patent Laid-Open No. 52-040111, it is possible to write the information securely at the location indicated by the calculated physical address and reduce problems of writing the information to a wrong location.

In recent years, there are an increasing number of failures of hardware, and in particular, those of RAMs due to higher integration of semiconductors. There is also a problem of a failure as to the magnetic disk device, for instance, that the RAMs are used in a circuit for calculating the above-mentioned physical address and so the information is mistakenly written to a sector different from the sector to which the specified logical address is assigned due to a failure of the RAM.

In the case where the logical address is converted to a wrong physical address according to the technique described in Japanese Patent Laid-Open No. 52-040111, however, the head is moved to the sector indicated by that wrong physical address so as to have the information written to a wrong sector in the end. In the sector having the information thus mistakenly written thereto, it is no longer possible to read out that information. In the sector having the specified logical address assigned and no information written thereto, there is also a problem that wrong information recorded therein by chance is read and data gets garbled.

The above-mentioned problem is not limited to the magnetic disk device but is the problem that generally arises in a field for using an information storage device which calculates a location on an information recording medium based on the logical address.

SUMMARY OF THE INVENTION

The present invention has been made in view of the above circumstances and provides an information storage device and a write control circuit capable of avoiding a problem of writing information to a wrong location on an information recording medium.

The information storage device of the present invention is the one including:

an information recording medium including multiple recording areas having logical addresses assigned thereto, each of the recording areas having information recorded therein with a check code generated based on the logical address of the recording area added thereto;

a recorded information obtaining section that obtains information to be recorded on the information recording medium and the logical address assigned to the recording area in which the information is to be recorded;

a converting section that converts the logical address to a physical location of the recording area on the information recording medium;

a checking section that checks whether or not there is a match between a check code recorded in the recording area at the location converted from the logical address obtained by the recorded information obtaining section and the logical address assigned to the recording area; and a write control section that allows, if confirmed by the checking section that there is a match, writing of information in the recording area at the converted location.

As with a magnetic disk device in general, the information storage device of the present invention has the information with a check code generated based on the logical address added thereto recorded on the information recording medium in advance. On recording the information, the logical address assigned to the recording area on which the information is recorded is converted to the physical location of the recording area on the information recording medium so as to read the information of the converted location. Furthermore, it is checked whether or not there is a match between the check code added to the read information and the logical address so as to write the information only in the case where it is confirmed that there is a match. For this reason, it is possible, according to the information storage device of the present invention, to avoid a problem of writing the information to a wrong location on the information recording medium.

The information storage device of the present invention is preferably in a form wherein:

information is written while scanning is carried out on the information recording medium in a predetermined direction; and the checking section allows reading of information recorded in a recording area at a location traced by a predetermined distance from the location converted by the converting section in a direction reverse to the predetermined direction on the information recording medium.

The information storage device of the present invention is preferably in a form wherein the checking section checks whether or not there is a match between a check bit and the logical address before the writing section reaches the recording area in which information is to be recorded so as to reduce processing time by effectively using traveling time of the writing section.

The information storage device of the present invention should preferably be the one wherein:

information is read while scanning is carried out on the information recording medium in a predetermined direction; and in the case where the recording area from which the information is read is a defective area, the checking section allows reading of information recorded in a recording area to be scanned immediately before the defective area.

In the case where the recording area read by the reading section is a defective area, it is possible to effectively use the traveling time of the writing section and securely check the match of the physical location of the recording area in which the information is to be recorded by reading the information recorded in the recording area located next to the defective area traced from the defective area in an direction reverse to the predetermined direction.

The information storage device of the present invention is preferably the one including:

a read address obtaining section that obtains a logical address assigned to a recording area from which information is to be read;

a read control section that allows reading of the information recorded in the recording area at the location converted from the logical address obtained by the read address obtaining section; and a sequence deciding section that decides an execution sequence of reading and writing of information under control of the write control section, the read control section and the checking section so as to reduce total execution time.

The execution sequence of reading and writing of the information executed by each of the reading section and the writing section is decided to reduce the total execution time including the reading for an address check by the checking section. Thus, the processing is efficiently executed.

The information storage device of the present invention is preferably the one "including:

a reading section that reads information from the information recording medium;

a cache that stores information read by the reading section;

a read address obtaining section that obtains a logical address assigned to a recording area from which information is to be read; and a read control section that has the converting section convert the logical address obtained by the read address obtaining section to the location, has the reading section read information recorded in the recording area at the converted location, and has that information outputted from the cache instead of information reading by the reading section in the case where the information is stored in the cache, and wherein:

the reading section reads information while scanning on the information recording medium in a predetermined direction; and on having information read by the reading section, the checking section also has the reading section read the information as to other recording areas existing halfway in a scan heading for the recording area to be read."

The read information is stored in the cache, and the information stored in the cache is read when reading the same information next time so that the processing time is improved.

The information storage device of the present invention is preferably in a form wherein:

"the converting section includes a conversion definition defining a conversion relation between a logical address and the location, and converts the logical address to the location according to the conversion definition, and the device includes a definition correcting section that re-creates the conversion definition included in the converting section in the case where the checking section confirms that there is no match."

As the conversion definition is included, it is possible to convert the logical address to the physical location at high speed. In the case where there is no longer a match due to a failure of a RAM, the conversion definition can be re-created to improve reliability of the information storage device.

The information storage device of the present invention is preferably the one "including an area replacing section for replacing a recording area which is a defective area with another recording area, and wherein:

in the case where the recording area from which information is read by the reading section is a defective area, the write control section registers the recording area as a candidate to be replaced with another recording area by the area replacing section."

In the case where the recording area from which information is read by the reading section is a defective area, the defective area is registered as a candidate to be replaced with another recording area. Thus, it is possible to replace the candidate with another recording area after finishing the reading and writing of the information so as to reduce the load of processing.

The information storage device of the present invention is preferably the one "including a reading section that reads information from the information recording medium and an area replacing section for replacing a recording area which is a defective area with another recording area, and wherein:

in the case where the recording area from which information is read by the reading section is a defective area and is included in the recording area to record the information obtained by the recorded information obtaining section, the write control section has the recording area as the defective area replaced with another recording area immediately by the area replacing section."

In the case where the recording area in which information is to be written by the writing section is a defective area, it is possible to improve reliability of information access by replacing the defective area with another recording area.

The write control circuit of the present invention is the one including:

a recorded information obtaining section that obtains information recorded on an information recording medium and a logical address assigned to a recording area in which the information is to be recorded;

a checking section that checks whether or not there is a match between a check code recorded in a recording area located at a physical location converted from the logical address obtained by the obtaining section and the logical address assigned to the recording area; and a write control section that has information written to the recording area located at the converted physical location in the case where the checking section confirms that there is a match."

According to the write control circuit of the present invention, it is possible to have the information written to a correct recording area to which a specified logical address is assigned.

According to the present invention, it is possible to avoid the problem of writing the information to a wrong location on the information recording medium.

BRIEF DESCRIPTION OF THE DRAWINGS

FIG. 12 is a conceptual diagram showing the sectors scanned by the magnetic head in the processing of steps S34 and S35 in the flowchart of FIG. 9;

FIG. 13 is a conceptual diagram showing the sectors scanned by the magnetic head in the processing of steps S36 and S37 in the flowchart of FIG. 9;

DETAILED DESCRIPTION OF THE INVENTION

Hereunder, embodiments of the present invention will be described by referring to the attached drawings.

Figure 2:
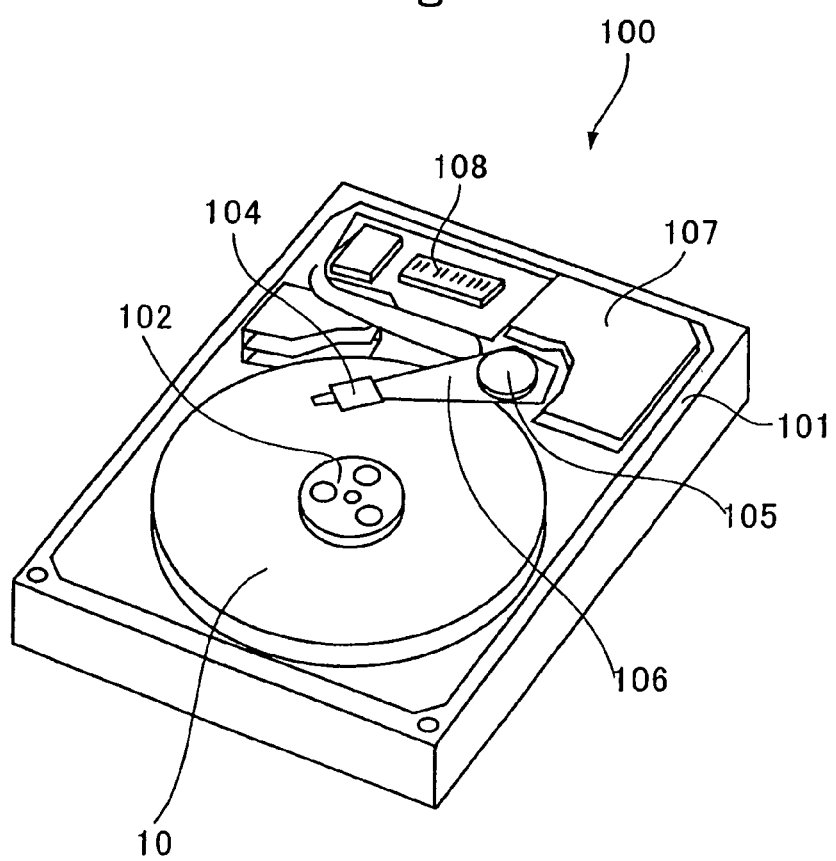
FIG. 2 is an external view of a hard disk drive which is one embodiment of the present invention.

FIG. 2 is an external view of a hard disk drive to which one the embodiments of the present invention is applied.

A hard disk drive 100 shown in FIG. 2 is equivalent to an embodiment of an information storage device of the present invention, which is used by being connected to or built in a host device represented by a personal computer and the like. A magnetic disk 10 built in the hard disk drive 100 has the same configuration as a conventional magnetic disk, and FIG. 1 used in the description of the related art is diverted to the description of the present invention.

As shown in FIG. 2, a housing 101 of the hard disk drive 100 has the magnetic disk 10 with a magnetic layer provided on its surface, a spindle motor 102 for rotating the magnetic disk 10, a levitation head slider 104 opposed to the magnetic disk 10 in proximity to a surface thereof, an arm axis 105, a carriage arm 106 for traveling horizontally on the magnetic disk 10 while centering on the arm axis 105 and having the levitation head slider 104 firmly fixed at its end, a voice coil motor 107 for driving the horizontal travel of the carriage arm 106 and a control circuit 108 for controlling operation of the hard disk drive 100 housed therein. The levitation head slider 104 is moved onto the magnetic disk 10 only in the case where information access is performed to the magnetic disk 10, and is retracted outside the magnetic disk 10 in the case where no information access is performed. A magnetic head 109 (refer to FIG. 3) for applying a magnetic field to the magnetic disk 10 is provided at the end of the levitation head slider 104. The hard disk drive 100 uses this magnetic field to record information on the magnetic disk 10 and read information recorded thereon. The hard disk drive 100 originally includes multiple magnetic disks 10, and each of the multiple magnetic disks is provided with the magnetic heads 109 on both sides thereof. For the sake of simplification, however, this embodiment will be described by focusing attention on one magnetic disk 10 and one magnetic head 109 provided on the upper side of the magnetic disk 10.

Figure 3:
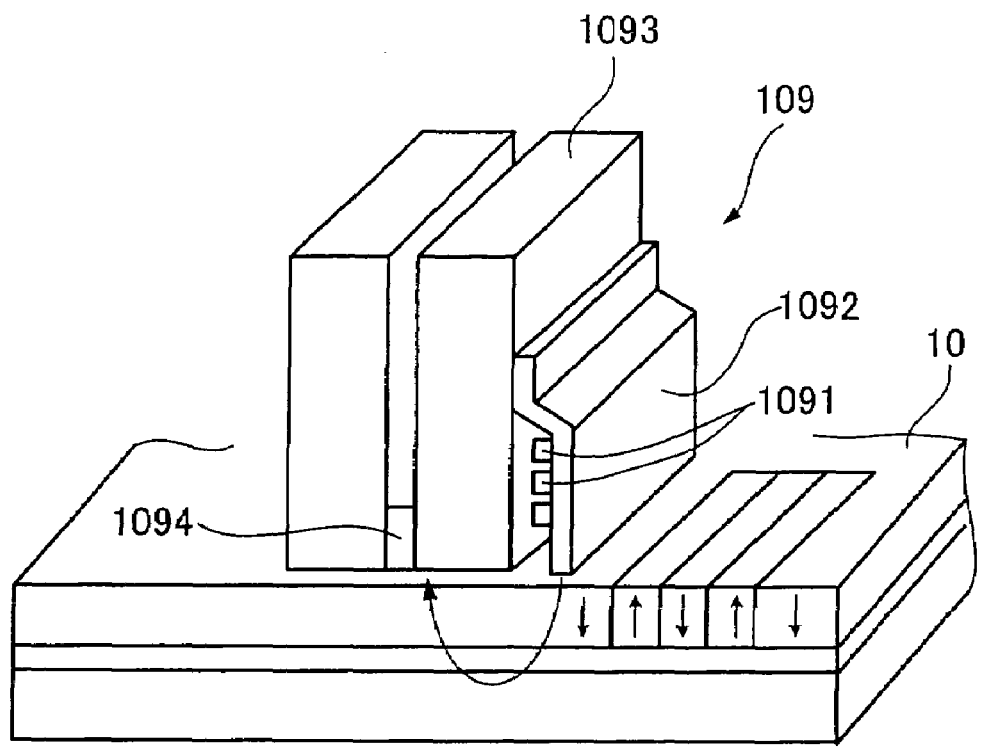
FIG. 3 is a diagram showing a part of a magnetic head.

FIG. 3 is a diagram showing a part of the magnetic head 109.

FIG. 3 shows a cross section structure of a part of the magnetic head 109 mounted at the end of the levitation head slider 104. The magnetic head 109 seemingly travels from right to left in FIG. 3, as the magnetic disk 10 is rotated, along tracks 12 (refer to FIG. 1) of the magnetic disk 10 in a state of being positioned on the magnetic disk 10.

The magnetic head 109 has a magnetic coil 1091 built therein. When recording information, the magnetic coil 1091 has an electrical record signal inputted thereto, and generates a magnetic field in a direction according to the information. Lines of magnetic force corresponding to the magnetic field concentrate on a main pole 1092 and extend to the magnetic disk 10. Thus, the magnetic field is applied to the surface of the magnetic disk 10, and magnetization is formed in the direction according to the information at a position opposed to the main pole 1092. The lines of magnetic force having formed the magnetization on the magnetic disk 10 are diffused and return to a return yoke 1093 of the magnetic head 109. When put together, the magnetic coil 1091, main pole 1092 and return yoke 1093 are equivalent to an example of the writing section of the present invention.

The magnetic head 109 also has a regenerative element 1094 for generating a resistance value according to the magnetic field generated from the magnetization built therein. When reproducing information, a current is passed through the regenerative element 1094 so as to generate a regenerative signal according to the state of magnetization. According to this embodiment, a detailed type of the regenerative element 1094 is not limited in particular. However, a GMR (Giant Magneto-Resistance) element and a TMR (Tunnel Magneto-Resistance) element are adoptable as there generative element 1094 for instance. The regenerative element 1094 is equivalent to a part of the reading section of the present invention.

Figure 1:
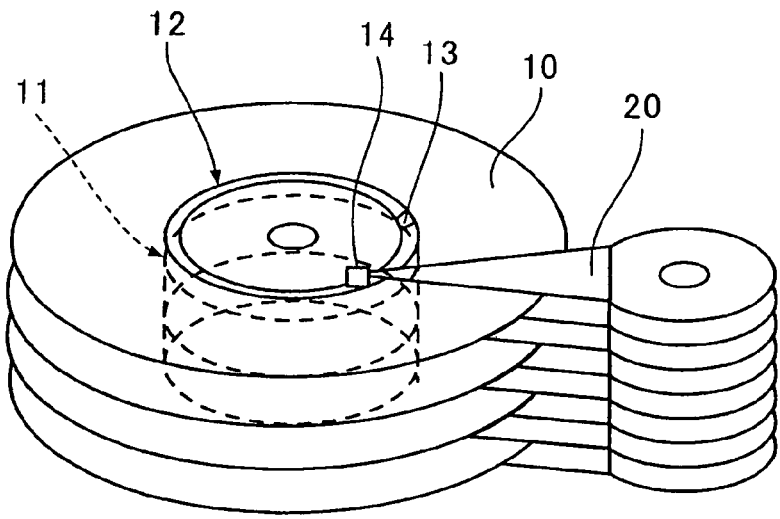
FIG. 1 is a conceptual diagram of a magnetic disk device.

As shown in FIG. 1, the magnetic disk 10 has the linear tracks 12 provided on its surface and is divided into multiple sectors 13 in a circumferential direction of the tracks 12.

Logical addresses (LBA) as a sequence of serial numbers are assigned to the sectors 13. A logical address is specified by the host device, and then information access is performed to the sector 13 to which the logical address is assigned. The magnetic disk 10 is equivalent to an example of an information recording medium of the present invention while the sector 13 is equivalent to an example of a recording area of the present invention.

Figure 4:
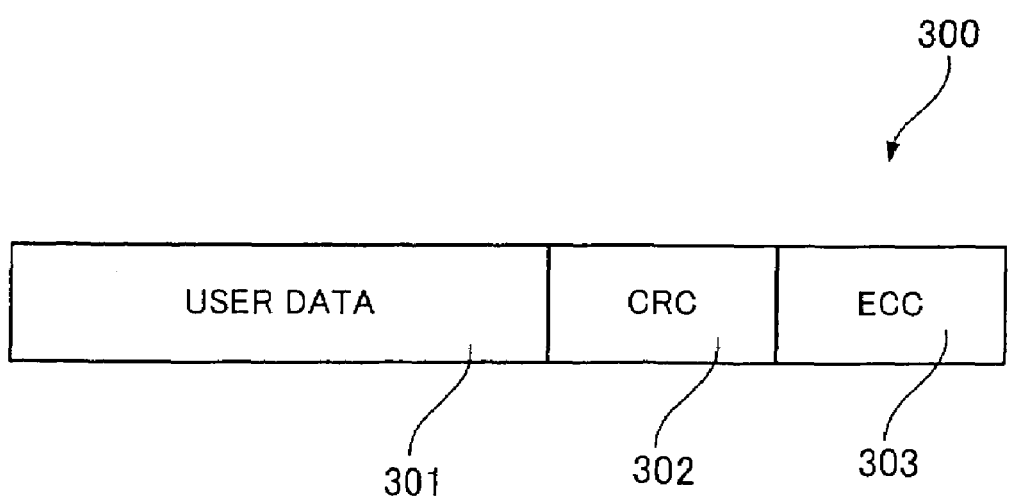
FIG. 4 is a conceptual diagram showing data to be stored in a magnetic disk.

FIG. 4 is a conceptual diagram showing data to be stored in the magnetic disk 10.

User data 301 as a subject of the information access from the host device to the hard disk drive 100 is stored along the tracks 12 except the track of the outermost circumference of the magnetic disk 10. The track 12 of the outermost circumference is a control area for storing various kinds of control data on the hard disk drive 100 rather than the user data 301. The user data 301 has a CRC (Cycle Redundancy Check) 302 for checking errors of the user data 301 and an ECC (Error Correction Code) 303 for correcting the errors of the user data 301 added to a tail end of the user data 301. A data set 300 configured by the user data 301, CRC 302 and ECC 303 is recorded in each of the sectors. The CRC 302 is the data calculated based on the user data 301 and the logical address assigned to the sector in which the data set 300 is written, and the ECC 303 is the data calculated based on the user data 301. The CRC 302 is equivalent to an example of a check code of the present invention. At the time of shipment of the hard disk drive 100, "0" is stored as a default of the user data 301 in each of the sectors, and the CRC 302 and ECC 303 are the data calculated based on the default.

Figure 5:
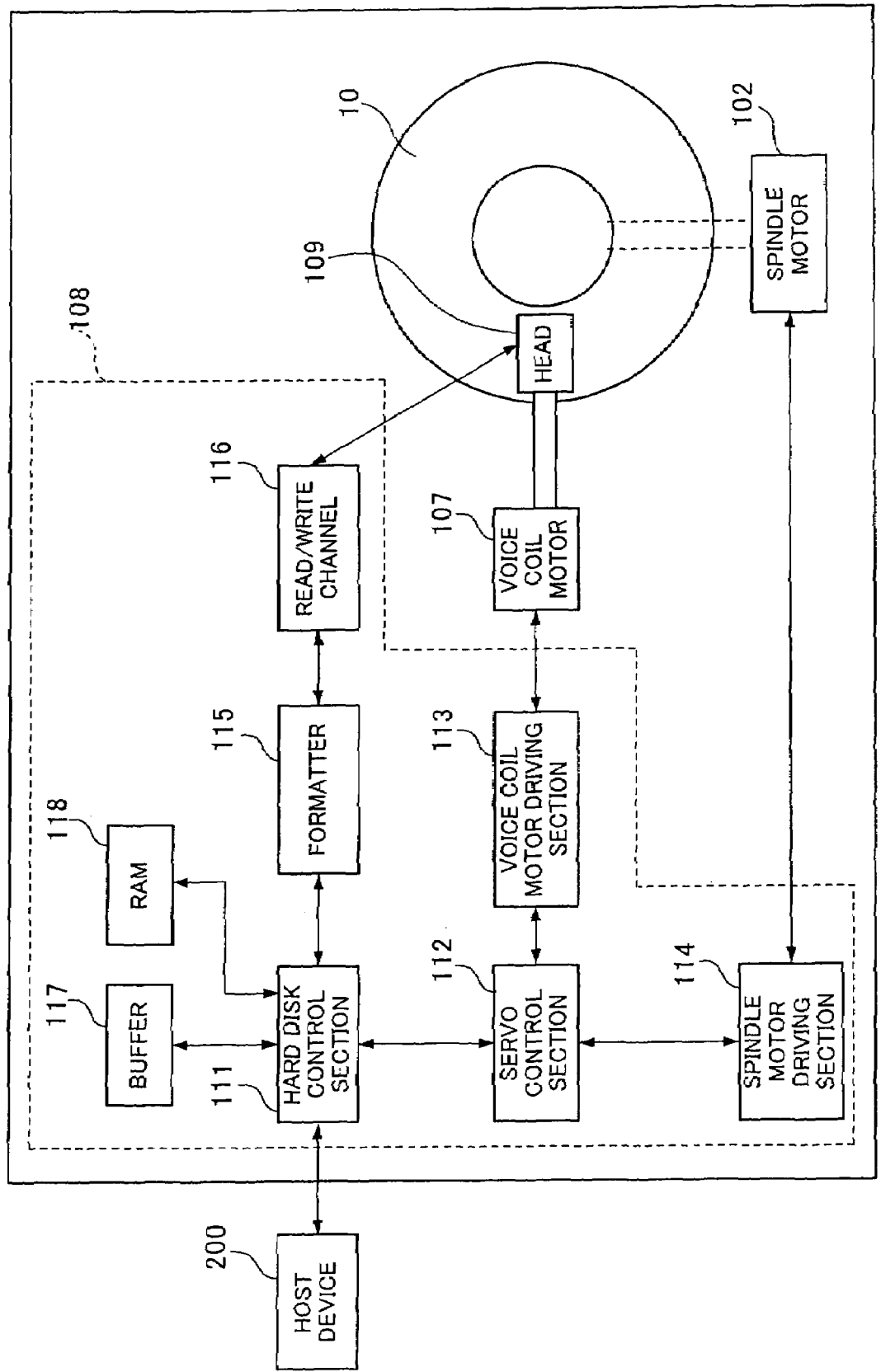
FIG. 5 is a functional block diagram of the hard disk drive.

FIG. 5 is a functional block diagram of the hard disk drive 100.

As also shown in FIG. 2, the hard disk drive 100 includes the spindle motor 102, magnetic disk 10, voice coil motor 107, control circuit 108, magnetic head 109 and the like. The control circuit 108 is equivalent to an embodiment of a write control circuit of the present invention, which is configured by a hard disk control section 111 for converting the logical address to a physical address and controlling the entire hard disk drive 100, a servo control section 112 for controlling the spindle motor 102 and voice coil motor 107, a voice coil motor driving section 113 for driving the voice coil motor 107, a spindle motor driving section 114 for driving the spindle motor 102, a formatter 115 for formatting the magnetic disk 10, a read/write channel 116 for generating a write current supporting the data set 300 to be written to the magnetic disk 10 and converting to digital data a regenerative signal obtained by reading the data set 300 recorded on the magnetic disk 10 by the magnetic head 109, a buffer 117 used as a cache in the hard disk control section 111, an RAM 118 used as a work area in the hard disk control section 111 and the like. The buffer 117 is equivalent to an example of the cache of the present invention. The hard disk control section 111 is equivalent to a combination of examples of a converting section, a recorded information obtaining section, a checking section, a read address obtaining section, a sequence deciding section, a definition correcting section and an area replacing section of the present invention. The hard disk control section 111 and read/write channel 116 are equivalent, when put together, to examples of a write control section and a read control section of the present invention.

Figure 6:
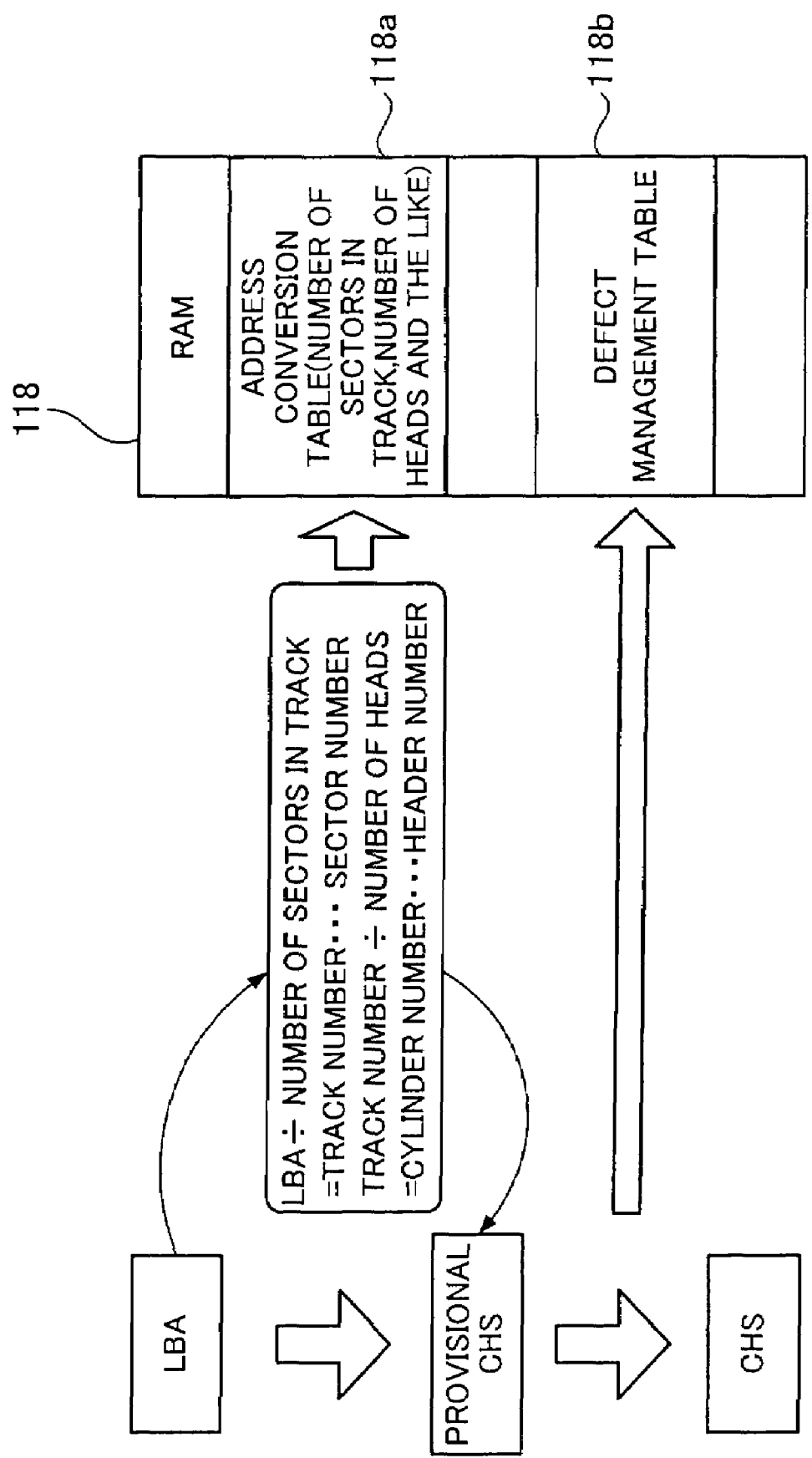
FIG. 6 is a conceptual diagram showing a procedure for calculating a physical address based on a logical address.

FIG. 6 is a conceptual diagram showing a procedure for calculating the physical address based on the logical address.

The control area (track 12 of the outermost circumference) of the magnetic disk 10 has various parameters such as "the number of sectors 13 on one track 12," "the number of magnetic heads 109" and a physical address of an inaccessible defective sector (defective address) stored therein in advance.

On turning on power of the hard disk drive 100, the hard disk control section 111 first obtains various parameters stored in the control area of the magnetic disk 10. Based on the obtained various parameters, the hard disk control section 111 constructs an address conversion table 118a having "the number of sectors 13 on one track 12," "the number of magnetic heads 109" and the like registered therewith and a defect management table 118b having a physical address of a defective sector (defective address) and a physical address of an alternative sector used instead of the defective sector (alternative address) registered therewith. The constructed address conversion table 118a and defect management table 118b are loaded into the RAM 118.

On having the logical address specified by a host device 200, the hard disk control section 111 calculates the physical address (CHS; Cylinder, Head and Sector) indicating the physical location of each of the sectors 13 based on a specified logical address. In this embodiment, calculation is performed as to the physical address configured by a cylinder number representing one of the multiple magnetic disks 10, a head number representing one of the multiple heads 109 and a sector number representing one of the sectors on the magnetic disk 10.

First, the specified logical address is divided by "the number of sectors 13 on one track 12" registered with the address conversion table 118a, where it is decided that a quotient thereof is a track number and a remainder thereof is the sector number.

Subsequently, the calculated track number is divided by "the number of magnetic heads 109" registered with the address conversion table 118a, where it is decided that a quotient thereof is a cylinder number and a remainder thereof is the head number.

The cylinder number, head number and sector number calculated as described above are decided to be a provisional physical address.

Furthermore, the defect management table 118b is referred to so as to determine whether or not the provisional physical address is registered as a defective address. If the provisional physical address is not registered as a defective address, the provisional physical address is decided to be an official physical address. If the provisional physical address is registered as a defective address, the alternative address of the defective address is decided to be an official physical address.

Here, if the address conversion table 118a or the defect management table 118b is destroyed due to a failure of the RAM 118, there are the cases where, even if a correct logical address is specified by the host device 200, that logical address is converted to a wrong physical address. If the data set 300 is recorded in the sector 13 indicated by the wrong physical address, there arises a problem that the data set 300 becomes unreadable. The hard disk drive 100 of this embodiment determines whether or not the logical address is converted to a correct physical address before the data set 300 is written. As for the information access, the present invention is characterized by writing of the data rather than reading of the recorded data. Therefore, a description will be given below by paying attention to the writing of the data.

Figure 7:
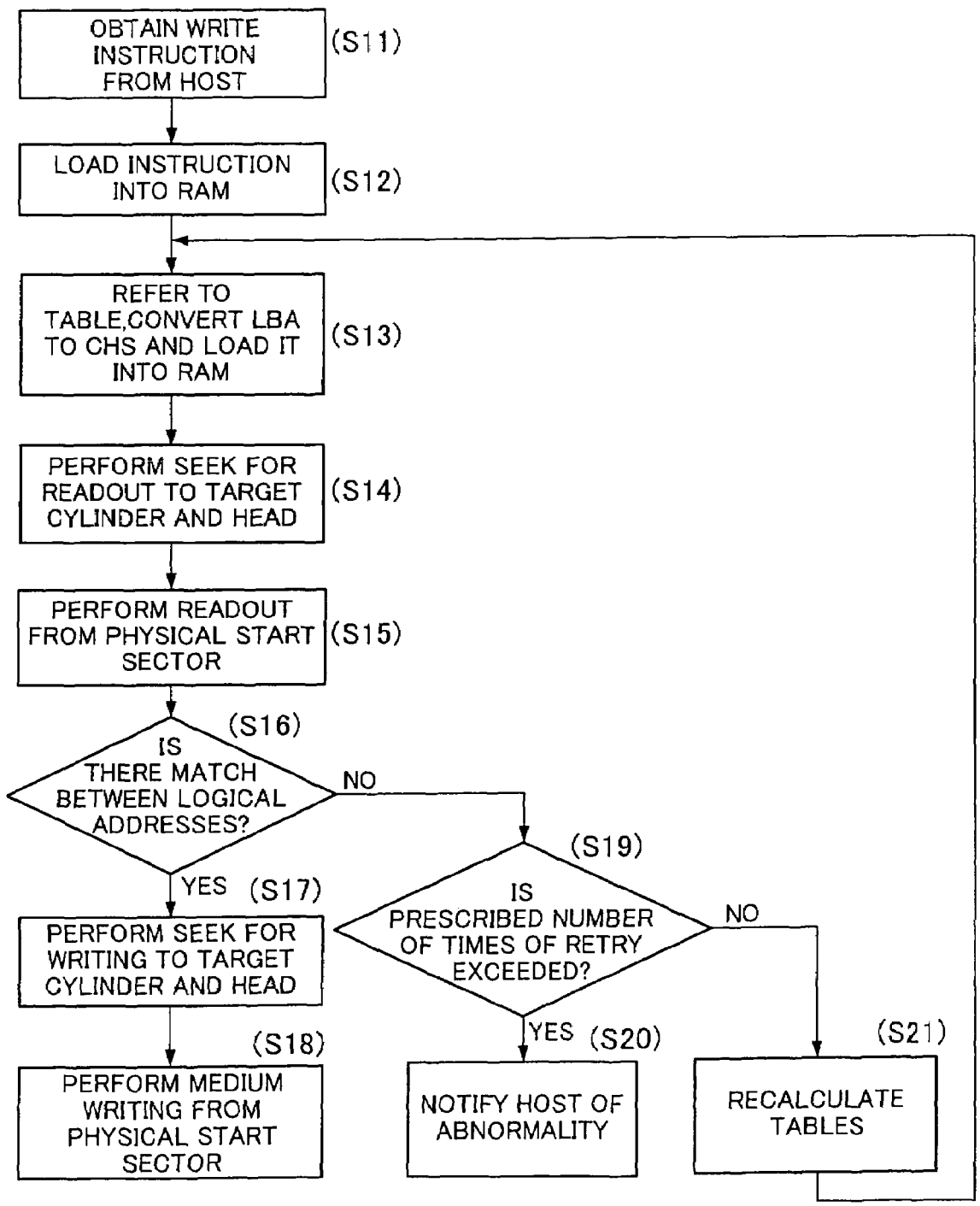
FIG. 7 is a flowchart showing a sequence of processing until the data is written to a sector to which a specified logical address is assigned.

FIG. 7 is a flowchart showing a sequence of processing until the data is written to the sector to which a specified logical address is assigned.

When recording the data set 300, the user data 301 to be recorded and the logical address of the sector 13 to have the user data 301 written therein are sent from the host device 200. The hard disk control section 111 obtains the logical address and the user data 301 sent from the host device 200 (step S11 of FIG. 7) and loads them into the RAM 118 (step S12 of FIG. 7).

Subsequently, the hard disk control section 111 refers to the address conversion table 118*a* and defect management table 118*b* stored in the RAM 118, and converts the logical address loaded into the RAM 118 to the physical address according to the procedure described by using FIG. 6 (step S13 of FIG. 7). The converted physical address is loaded into the RAM 118 and transmitted to the servo control section 112.

The servo control section 112 transmits an instruction to rotate the spindle motor 102 to the spindle motor driving section 114, and also transmits an instruction to move the carriage arm 106 (refer to FIG. 2) to the voice coil motor driving section 113. The spindle motor driving section 114 rotates the magnetic disk 10 by driving the spindle motor 102, and the voice coil motor driving section 113 moves the carriage arm 106 by driving the voice coil motor 107. Consequently, the magnetic head 109 is positioned on the magnetic disk 10. Here, according to this embodiment, the physical address configured by the cylinder number, head number and sector number is transmitted, and the magnetic head 109 corresponding to the head number of the physical address out of the multiple magnetic heads 109 is positioned on the cylinder corresponding to the cylinder number of the physical address by movement of the carriage arm 106. As the magnetic disk 10 is rotated in the state of having the magnetic head 109 positioned, the magnetic head 109 scans on the magnetic disk 10 along the tracks 12.

If a scanning position of the magnetic head 109 reaches the sector 13 indicated by the sector number of the physical address (step S14 of FIG. 7), the read/write channel 116 reads the data set 300 recorded in the sector 13 (step S15 of FIG. 7). The read data set 300 is transmitted to the hard disk control section 111.

The hard disk control section 111 obtains the user data 301 and the CRC 302 in the read data set 300, and calculates back the logical address assigned to the sector 13 in which the data set 300 is recorded based on the user data 301 and CRC 302. And the hard disk control section 111 determines whether or not the calculated logical address matches with the logical address obtained from the host device 200 in step S11.

In the case where the calculated logical address matches with the logical address obtained from the host device 200 (step S16 of FIG. 7: Yes), the hard disk control section 111 generates the CRC 302 and ECC 303 based on the user data 301 and logical address loaded into the RAM 118 in step S1. Furthermore, the hard disk control section 111 generates a new data set 300 by adding the generated CRC 302 and ECC 303 to the user data 301. And it transmits the generated data set 300 to the read/write channel 116 and also transmits the physical address loaded into the RAM 118 to the servo control section 112 in step S2.

The servo control section 112 has the magnetic head 109 scan on the magnetic disk 10 while maintaining the position of the magnetic head 109. The scanning position of the magnetic head 109 reaches the sector 13 indicated by the sector number of the transmitted physical address due to the rotation of the magnetic disk 10 (step S17 of FIG. 7).

The read/write channel 116 applies the write current supporting the data set 300 to the magnetic head 109. The magnetic head 109 applies a recording field onto the magnetic disk 10 based on the write current. Consequently, a magnetization direction of a recording film of the magnetic disk 10 is adjusted according to the direction of the data set 300 so as to record the data set 300 on the magnetic disk 10 (step S18 of FIG. 7).

Figure 8:
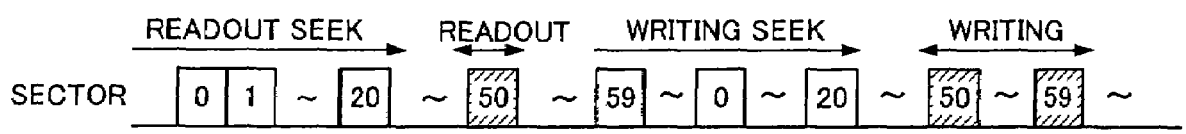
FIG. 8 is a conceptual diagram showing the sectors to be scanned by the magnetic head in the sequence of processing from step S1 to step S18.

FIG. 8 is a conceptual diagram showing the sectors scanned by the magnetic head 109 in the sequence of processing from step S1 to step S18.

For instance, in the case of writing the information of ten sectors from the sector 13 having a logical address (LBA) "50" assigned thereto, the logical address "50" is converted to a physical address (cylinder number "0," head number "0" and sector number "50") so that the magnetic head 109 corresponding to the cylinder number "0" and head number "0" of the converted physical address is positioned on the magnetic disk 10. As the magnetic disk 10 is rotated in the state of having the magnetic head 109 positioned, the magnetic head 109 scans the sectors 13 from the positioned sector 13 to that of the sector number "49" in sequence. If the scanning position of the magnetic head 109 reaches the sector 13 of the sector number "50," the data set 300 recorded in the sector 13 is obtained by the read/write channel 116 so that the determination process shown in step S16 of FIG. 7 is performed based on the CRC 302 in the read data set 300. In the case where the logical address calculated based on the CRC 302 matches with the logical address specified by the host device 200, the data set 300 is written to the ten sectors 13 from the sector number "50" to the sector number "59" when the scanning position of the magnetic head 109 reaches the sector 13 of the sector number "50" next time.

In the case where the logical address calculated back based on the user data 301 and CRC 302 does not match with the logical address specified by the host device 200 in step S16 of FIG. 7 (step S16 of FIG. 7: No), the hard disk control section 111 reacquires the various parameters stored in the control area (track 12 of the outermost circumference) of the magnetic disk 10. The hard disk control section 111 reconstructs the address conversion table 118*a* and the defect management table 118*b* based on those various parameters (step S21 of FIG. 7). Furthermore, the logical address is reconverted to the physical address by using the new address conversion table 118*a* and defect management table 118*b* (step S13 of FIG. 7), and the data set 300 recorded in the sector 13 indicated by the new physical address is read (steps S14 and S15 of FIG. 7) so as to perform the determination process based on the new CRC 302 (step S16 of FIG. 7).

In the case where the logical address calculated based on the CRC 302 does not match with the logical address specified by the host device 200 even after creating the various tables, converting to the physical address, obtaining the data set 300 recorded in the sector of the new physical address and performing the determination process a predetermined number of times (such as three times) as described above (step S19 of FIG. 7: No), an interface control section 1111 notifies the host device 200 of a "writing error" and writing of the data set 300 is not performed.

Thus, according to the hard disk drive 100 of this embodiment, the writing of subject data is performed only in the case where the logical address calculated based on the CRC 302 matches with the logical address specified by the host device 200. Therefore, it prevents the problem of writing the data to a wrong location on the magnetic disk 10.

The above concludes the description of the first embodiment of the present invention, and a second embodiment of the present invention will be described. As the hard disk drive of the second embodiment of the present invention has the same configuration as the hard disk drive 100 of the first embodiment, FIGS. 1 to 5 are diverted to the description of the second embodiment and only the differences from the first embodiment will be described.

Figure 9:
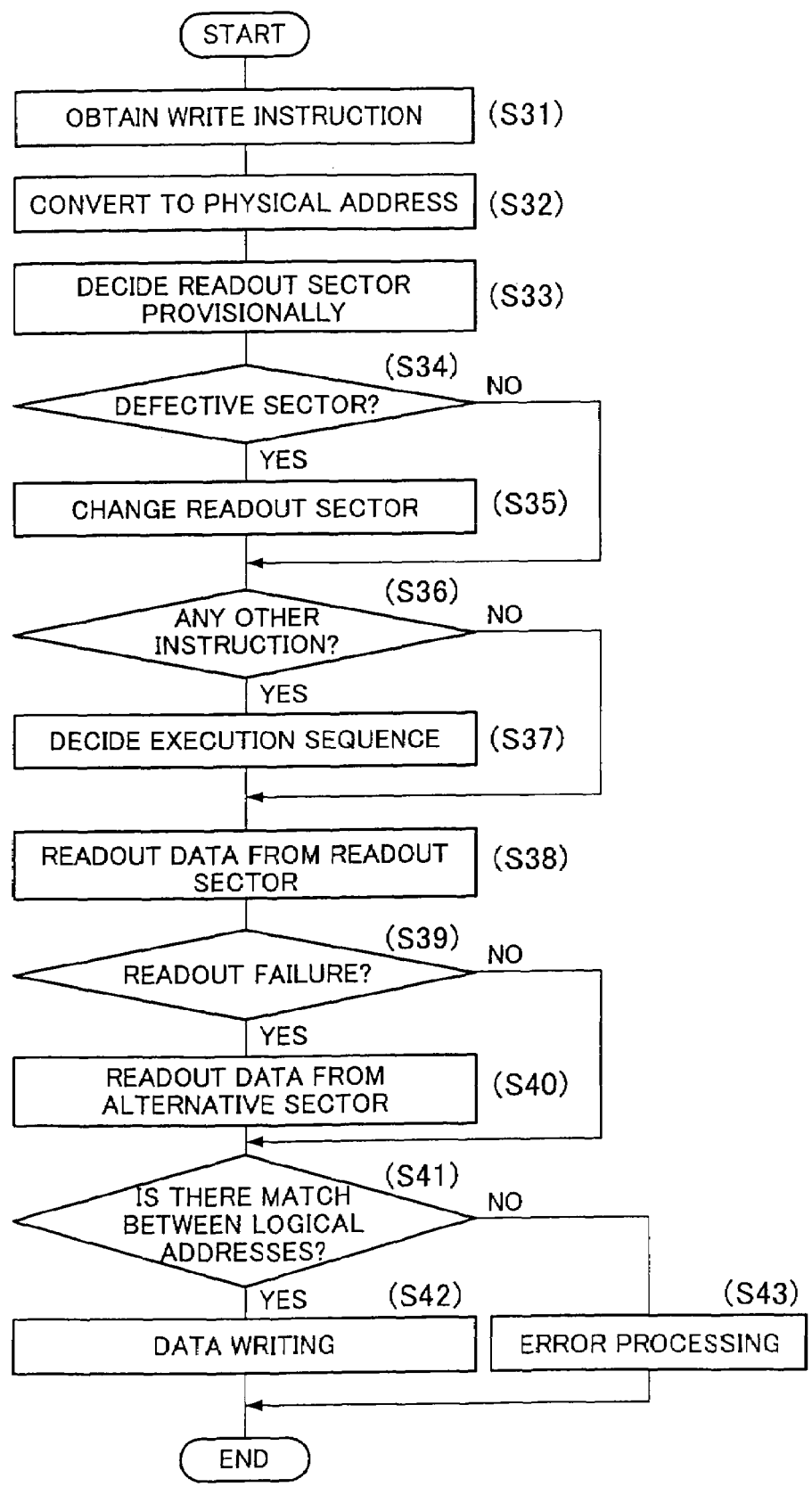
FIG. 9 is a flowchart showing the sequence of processing until the data is written to the sector to which a specified logical address is assigned in the hard disk drive of a second embodiment.

FIG. 9 is a flowchart showing a sequence of processing until the data is written to the sector to which a specified logical address is assigned in the hard disk drive of the second embodiment. FIGS. 10, 11, 12, 13, 14 and 15 are conceptual diagrams showing the sectors scanned by the magnetic head 109 in the sequence of processing shown in the flowchart of FIG. 9.

If the user data 301 and the logical address are transmitted by the host device 200 (step S31 of FIG. 9), the hard disk control section 111 converts the logical address to the physical address as in steps S12 and S13 of FIG. 7 (step S32 of FIG. 9).

Subsequently, the hard disk control section 111 provisionally decides as a readout sector 13 the sector 13 at a location traced in a direction reverse to the scanning direction of the magnetic head 109 by a predetermined number of sectors (30 sectors in this embodiment) rather than the sector 13 indicated by the converted physical address (step S33 of FIG. 9).

As in the first embodiment shown in FIG. 8, in the case of reading the data set 300 recorded in an access subject sector to which the data is written and performing the determination process by using the CRC 302 included in the data set 300, there arises a waiting time equal to at least 1 rotation of the magnetic disk 10 between the data reading for the determination process and actual data writing to the access subject sector. According to this embodiment, to reduce the rotation waiting time of the magnetic disk 10, the logical address is determined by reading the data set 300 recorded in the sector 13 at the location traced in the direction reverse to the scanning direction by 30 sectors further than the access subject sector.

Figure 10:
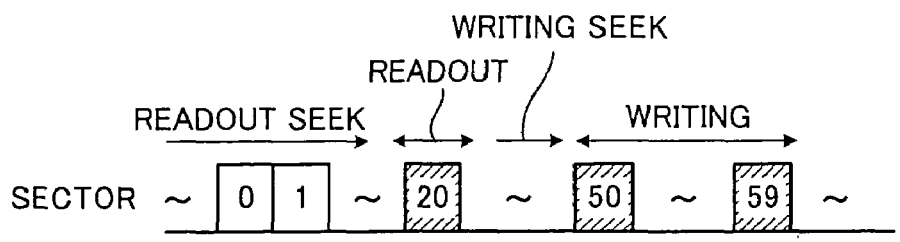
FIG. 10 is a conceptual diagram showing the sectors scanned by the magnetic head in the processing of step S33 in the flowchart of FIG. 9.

As shown in FIG. 10, in the case of writing the data sets 300 of ten sectors from the sector 13 having the logical address (LBA) "50" assigned thereto for instance, the logical address "50" is converted to a physical address (cylinder number "0," head number "0" and sector number "50") as in FIG. 8. Subsequently, the sector 13 of the sector number "20" preceding the sector 13 of the sector number "50" by 30 sectors is decided as the readout sector so that the data set 300 recorded in the readout sector is read.

Subsequently, the logical address of the readout sector (the sector 13 of the sector number "20") is calculated back based on the user data 301 and CRC 302 in the read data set 300, where this logical address has 30 sectors added thereto as the value of the calculated logical address of the access subject sector (the sector 13 of the sector number "50"). It is determined whether or not the calculated logical address of the access subject sector matches with the logical address of the access subject sector specified by the host device 200.

According to the hard disk drive of this embodiment, it is possible, after reading the readout sector of the sector number "20," to execute the writing of the data set 300 the moment the access subject sector of the sector number "50" reaches the magnetic head 109 so as to reduce the waiting time and improve processing speed.

Figure 11:
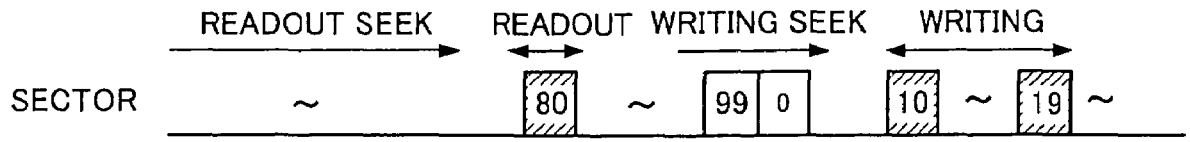
FIG. 11 is a conceptual diagram showing the sectors scanned by the magnetic head in the processing of step S33 in the flowchart of FIG. 9.

As shown in FIG. 11, in the case where the sector number of the readout sector becomes a minus value when provisionally deciding the readout sector traced from the access subject sector by the predetermined number of sectors, the sector number of the readout sector is calculated by using a formula of Sector number of access subject sector—Number of sectors traced+Total number of sectors on 1 track. As for the example in FIG. 11, the sector number of the readout sector is "80" as calculated by the formula of Sector number of access subject sector (10)—Number of sectors traced (30)+Total of sectors on 1 track (100).

In the case where the readout sector provisionally decided in step S33 of FIG. 9 is registered as the defective sector with the defect management table 118b loaded into the RAM 118 (step S34 of FIG. 9: Yes), the sector immediately before the provisionally decided readout sector is decided as the readout sector (step S35 of FIG. 9).

In the example shown in FIG. 12, the provisionally decided sector 13 of the sector number "20" is the defective sector, and the sector 13 of the sector number "19" immediately before it is decided as the readout sector so that the data set 300 recorded in the readout sector is read out. In the case where the provisionally decided readout sector is the defective sector, it is possible to read out the sector to be scanned immediately before that sector so as to curb increase in the processing time and improve reliability of the determination process.

In the case where an instruction other than that obtained in step S31 is transmitted from the host device 200 (step S36 of FIG. 9: Yes), the physical addresses having the logical addresses of the access subject sectors of all the instructions converted thereto and the physical addresses of the readout sectors of all the write instructions are obtained. To reduce the total processing time by connecting these addresses successively, an execution sequence is decided as to a process of writing for the access subject sector and a process of reading out for the readout sector according to a write instruction and a process of reading out for the access subject sector according to a readout instruction (step S37 of FIG. 9).

As shown in FIG. 13, in the case of receiving a write instruction to write the data sets 300 of ten sectors from the sector 13 having the logical address "50" (the sector number "50" of the converted physical address) assigned thereto and a readout instruction to read out the data sets 300 of five sectors from the sector 13 having the logical address "30" (the sector number "30" of the converted physical address) assigned thereto for instance, the execution sequence is decided to be in order of the readout process of accessing the sector 13 of the sector number "30" and then the writing process of accessing the sector 13 of the sector number "50" if the processing sequence is decided to connect the addresses concerning only the physical addresses of the access subject sectors of the instructions. To perform the writing process of accessing the sector 13 of the sector number "50," however, it is necessary in reality to read out the data recorded in the sector 13 of the sector number "20." Thus, the magnetic disk 10 must be rotated one extra time to perform the readout process and writing process. According to this embodiment, the execution sequence such as the readout process of accessing the sector 13 of the sector number 50," the readout process of accessing the sector 13 of the sector number "30" and the writing process of accessing the sector 13 of the sector number "50" is decided so as to sequentially connect not only the physical addresses of the access subject sectors but also the physical addresses of the readout sectors. Therefore, it is possible to perform the processing efficiently.

Figure 14:
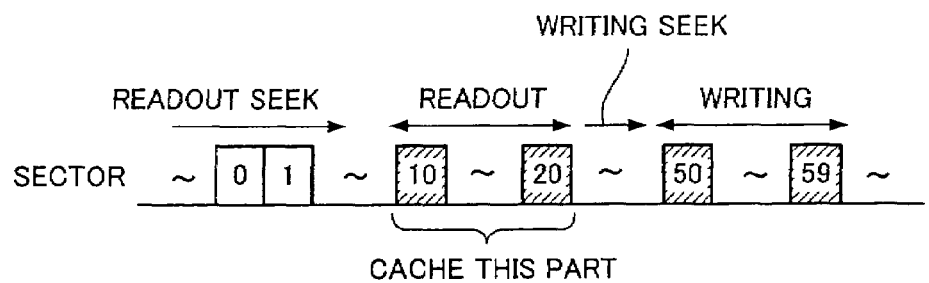
FIG. 14 is a conceptual diagram showing the sectors to be scanned by the magnetic head when registering read data with a cache.

As shown in FIG. 14, in the case of receiving a write instruction to write the data sets 300 of ten sectors from the sector 13 having the logical address "50" assigned thereto and a readout instruction to read the data sets 300 of five sectors from the sector 13 having the logical address "90" assigned thereto for instance, the writing process is performed after the readout process. However, there arises a rotation waiting time of the magnetic disk 10 in the time period when the magnetic head 109 finishes the readout process until it reaches the readout sector in the writing process. In this case, the magnetic head 109 reads the data set 300 recorded in each of the sectors from the sector 13 of the sector number "10" to the readout sector of the sector number "20" when the next readout becomes possible after finishing the readout process. The read data sets 300 are cached in the buffer 117. In the case where a readout instruction is given as to any of the sectors of the sector number "10" to the sector number "20" next time, the data set 300 cached in the buffer 117 is obtained so as to speedup the processing.

The readout process for the readout sector decided as above is performed (step S38 of FIG. 9). In the case where the user data 301 in the data set 300 recorded in the readout sector is garbled (step S39 of FIG. 9: Yes), the readout sector is considered as a defective sector even though not registered with the defect management table 118*b*. If the readout sector is the access subject sector, the readout sector is registered as a defective sector with the defect management table 118*b* and the control area of the magnetic disk 10 and an alternative sector instead of it is obtained (step S40 of FIG. 9). If the readout sector is not the access subject sector, the readout sector is registered as a candidate defective sector with the defect management table 118*b*, and then the candidate defective sector is registered as a defective sector with the defect management table 118*b* and the control area of the magnetic disk 10 in the time period when no information access is performed. In the case where the readout sector is not the access subject sector, it is possible to reduce the load of processing of the hard disk drive 100 by leaving the registration as a defective sector until later.

Figure 15:
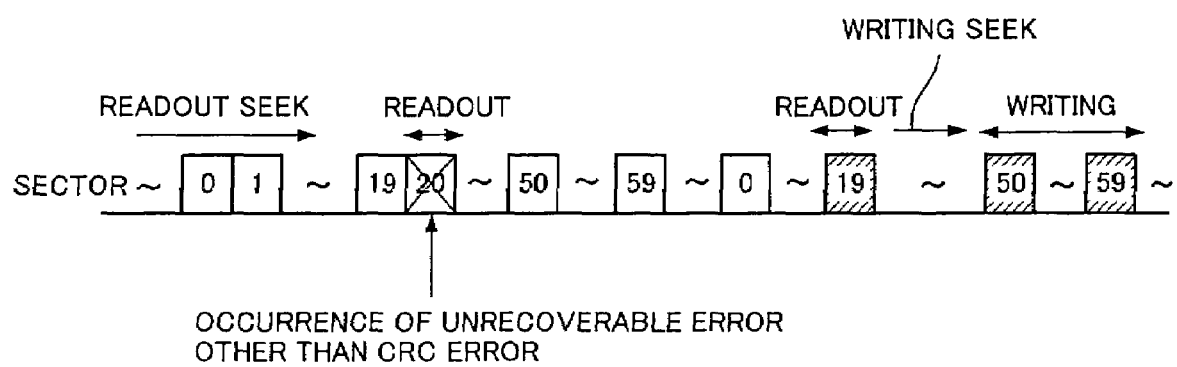
FIG. 15 is a conceptual diagram showing the sectors scanned by the magnetic head in the processing of steps S39 and S40 in the flowchart of FIG. 9.

As shown in FIG. 15, in the case of being unable to read out the user data recorded in the sector of the sector number "20" which is the readout sector, the user data recorded in the sector adjacent to the sector number "19" is read out. Thus, it is possible, in the case where the readout sector is a defective sector, to use another sector as the readout sector so as to improve the reliability of the hard disk drive 100.

The readout process for the readout sector is performed (step S38 of FIG. 9). In the case where the data set 300 recorded in the readout sector is successfully read out (step S39 of FIG. 9: Yes), the same determination process as that in step S16 of FIG. 7 is performed by using the CRC 302 included in the data set 300. If determined in the determination process that the logical address calculated based on the CRC 302 matches with the logical address specified in step S31 (step S41 of FIG. 9: Yes), the data is written by the same processing as that in steps S17 and S18 of FIG. 7. If determined that they do not match (step S41 of FIG. 9: No), an error message is transmitted to the host device 200 (step S43 of FIG. 9).

As described above, it is possible, according to the hard disk drive of this embodiment, to curb increase in the processing time and avoid the problem of writing the information to a wrong location on the information recording medium.

The above describes the hard disk drive for performing the information access by means of the magnetic fields. However, the information storage device of the present invention may also be an optical information storage device for performing the information access to an MO disk or the like by using light.

The above also describes the examples of generating the CRC based on the user data and logical address. However, the check code of the present invention may also be the one generated based only on the logical address.

What is claimed is:

1. An information storage device comprising:
   an information recording medium including multiple recording areas having logical addresses assigned thereto, each of the recording areas having information recorded therein with a check code generated based on the logical address of the recording area added thereto;
   a recorded information obtaining section that obtains information to be recorded on the information recording medium and the logical address assigned to the recording area in which the information is to be recorded;
   a converting section that converts the logical address to a physical location of the recording area on the information recording medium;
   a checking section that checks whether or not there is a match between a check code recorded in the recording area at the location converted from the logical address obtained by the recorded information obtaining section and the logical address assigned to the recording area; and
   a write control section that allows, if confirmed by the checking section that there is a match, writing of information in the recording area at the converted location.

2. The information storage device according to claim 1, wherein:
   information is written while scanning is carried out on the information recording medium in a predetermined direction; and
   the checking section allows reading of information recorded in a recording area at a location traced by a predetermined distance from the location converted by the converting section in a direction reverse to the predetermined direction on the information recording medium.

3. The information storage device according to claim 1, wherein:
   information is read while scanning is carried out on the information recording medium in a predetermined direction; and
   in the case where the recording area from which the information is read is a defective area, the checking section allows reading of information recorded in a recording area to be scanned immediately before the defective area.

4. The information storage device according to claim 1, wherein:
   a read address obtaining section that obtains a,logical address assigned to a recording area from which information is to be read;
   a read control section that allows reading of the information recorded in the recording area at the location converted from the logical address obtained by the read address obtaining section; and
   a sequence deciding section that decides an execution sequence of reading and writing of information under control of the write control section, the read control section and the checking section so as to reduce total execution time.

5. The information storage device according to claim 1, comprising:
   a reading section that reads information from the information recording medium;
   a cache that stores information read by the reading section;
   a read address obtaining section that obtains a logical address assigned to a recording area from which information is to be read; and
   a read control section that has the converting section convert the logical address obtained by the read address obtaining section to the location, has the reading section read information recorded in the recording area at the converted location, and has that information outputted from the cache instead of information reading by the reading section in the case where the information is stored in the cache, and wherein:

the reading section reads information while scanning on the information recording medium in a predetermined direction; and on having information read by the reading section, the checking section also has the reading section read information as to other recording areas existing halfway in a scan heading for the recording area to be read.

6. The information storage device according to claim 1, wherein:

the converting section includes a conversion definition defining a conversion relation between the logical address and the location, and converts the logical address to the location according to the conversion definition, and the device includes a definition correcting section that re-creates the conversion definition included in the converting section in the case where the checking section confirms that there is no match.

7. The information storage device according to claim 1, comprising an area replacing section for replacing a recording area which is a defective area with another recording area, and wherein:

in the case where the recording area from which information is read by the reading section is a defective area, the write control section registers the recording area as a candidate to be replaced with another recording area by the area replacing section.

8. The information storage device according to claim 1, comprising a reading section that reads information from the information recording medium and an area replacing section for replacing a recording area which is a defective area with another recording area, and wherein:

in the case where the recording area from which information is read by the reading section is a defective area and is included in the recording area to record information obtained by the recorded information obtaining section, the write control section has the recording area as the defective area replaced with another recording area immediately by the area replacing section.

9. A write control circuit comprising:

a recorded information obtaining section that obtains information recorded on an information recording medium and a logical address assigned to a recording area in which the information is to be recorded;

a checking section that checks whether or not there is a match between a check code recorded in a recording area located at a physical location converted from the logical address obtained by the recorded information obtaining section and the logical address assigned to the recording area; and a write control section that has information written to the recording area located at the converted physical location in the case where the checking section confirms that there is a match.

* * * * *